United States Patent [19]

Bachmann

[11] Patent Number: 5,368,700

[45] Date of Patent: Nov. 29, 1994

[54] SYSTEM AND METHOD FOR REDUCING HYDROCARBONS IN WASTEWATER

[75] Inventor: David E. Bachmann, Irvine, Calif.

[73] Assignee: Atlantic Richfield Company, Los Angeles, Calif.

[21] Appl. No.: 992,307

[22] Filed: Dec. 21, 1992

[51] Int. Cl.⁵ .................. B01D 3/38; C12F 1/04
[52] U.S. Cl. ........................ 203/10; 203/27; 203/92; 203/96; 208/363; 208/368; 210/767
[58] Field of Search ............... 203/10, 49, 14, 27, 203/95, 93, 96, 97, 92; 208/363, 368; 210/767, 805, 242.2; 588/230

[56] References Cited

U.S. PATENT DOCUMENTS

| | | | |
|---|---|---|---|
| 2,773,003 | 12/1956 | Brown et al. | 196/1 |
| 2,930,753 | 3/1960 | McMahon | 210/21 |
| 2,999,808 | 9/1961 | Brown | 208/264 |
| 3,219,554 | 11/1965 | Woodward | 159/DIG. 33 |
| 3,821,089 | 6/1974 | Hickman | 202/185.2 |
| 3,898,058 | 8/1975 | McGill | 55/50 |
| 4,310,387 | 1/1982 | Sadhukhan | 202/185.2 |
| 4,422,940 | 12/1983 | Cousino et al. | 210/631 |
| 4,495,056 | 1/1985 | Venardos et al. | 210/631 |
| 4,783,242 | 11/1988 | Robbins | 203/87 |
| 5,106,507 | 4/1992 | Von Klock et al. | 210/664 |

Primary Examiner—Virginia Manoharan
Attorney, Agent, or Firm—Joseph D. Yao

[57] ABSTRACT

A system and method for reducing hydrocarbons in wastewater includes an oil separator and a stripper tower. The tower has a housing that includes a stripper section and a condensation section. The stripper section includes a plurality of trays and steam inlet under the trays. The condensation section includes a plurality of trays and a pan tray having provisions to allow vapors to rise from the stripper section. The method includes having the oil separator remove the soluble oil from the wastewater stream which passes through the stripper section and has steam remove the hydrocarbons. The resulting vapors then contact cold process fluid which results in a heated process fluid stream. A portion of this heated process fluid stream is then mixed with crude so that hydrocarbons can be assimilated into the crude.

1 Claim, 1 Drawing Sheet

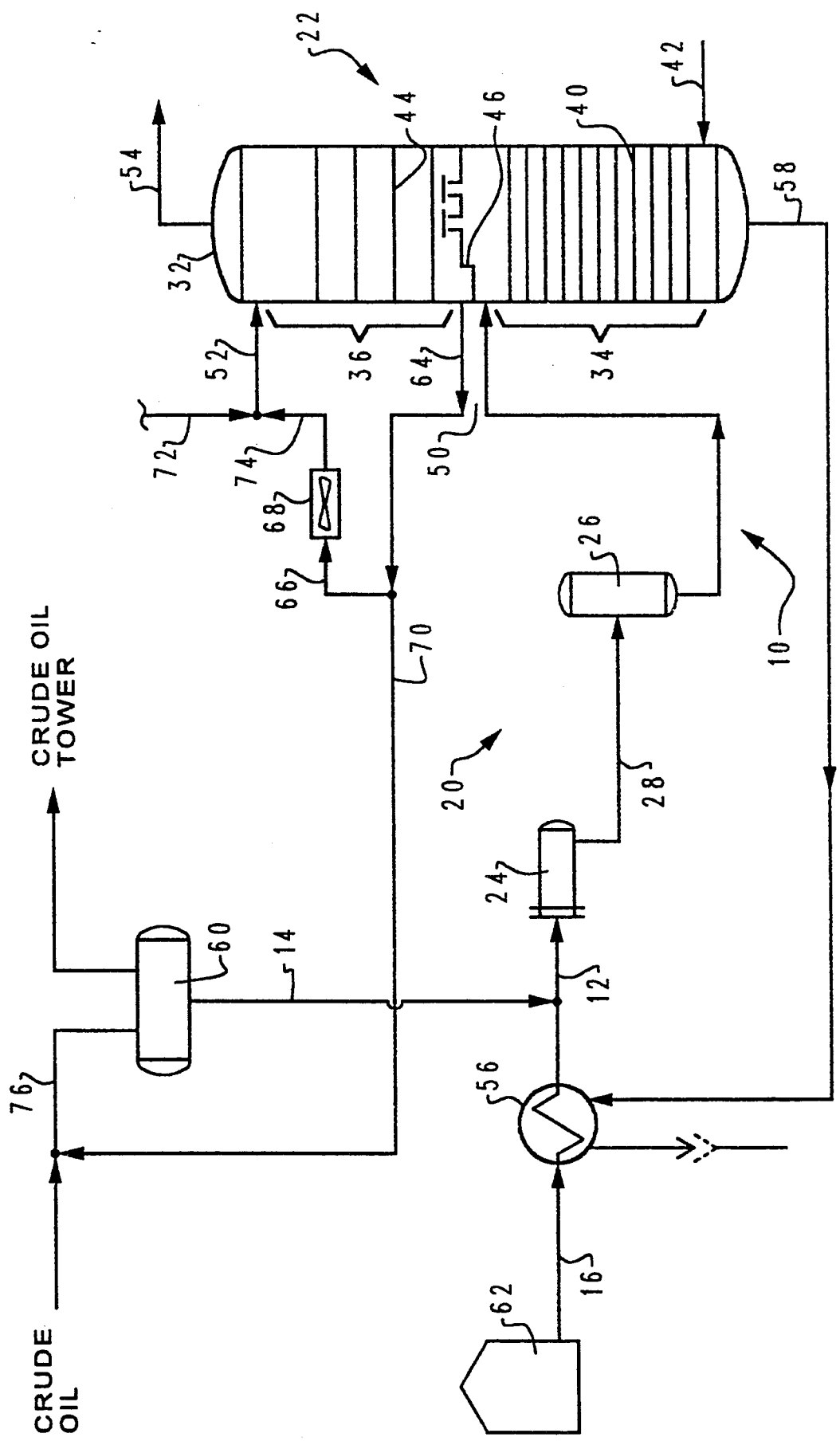

SYSTEM AND METHOD FOR REDUCING HYDROCARBONS IN WASTEWATER

BACKGROUND OF THE INVENTION

1. Field of the Invention

This invention relates to a system and method for reducing hydrocarbons in wastewater, and in particular, benzene in desalter effluent water and contaminated ground water.

2. Background Art

Government agencies are providing guidelines of how hazardous wastes shall be disposed of and limits to the amount of hazardous wastes that may be released to the atmosphere. The Environmental Protection Agency has prepared a regulation, entitled "National Emission Standards for Hazardous Air Pollutants" (NESHAPS), that provides that refinery wastewater shall have the benzene count reduced before it is released from the refinery. Desalter effluent water and other water streams of many refineries have benzene counts far in excess of the regulation limit.

The desalter effluent water is used to interact with crude oil in one or more stages to remove salts from the crude oil. This water-oil interaction results in benzene and other hydrocarbons becoming part of the desalter effluent water composition and raising the benzene level above the allowable regulation limits. The ground water around and under a refinery may be contaminated with benzene and other hydrocarbons from oil spills and leakages within the refinery facilities. This ground water also can have a benzene count that exceeds the allowable limit.

With this regulation in effect, refineries may no longer just dump their desalter effluent water or other hydrocarbon-contaminated water streams. If the refineries do so, they face stiff fines and penalties as set forth in the NESHAPS regulation for harming the environment.

SUMMARY OF THE INVENTION

In accordance with the present invention, hydrocarbons can be reduced in a wastewater stream by a system having an oil separator and a stripper tower. The tower has a housing having a stripper section that includes a plurality of trays and a steam inlet located below the stripper trays, and a condensation section located in the upper half of the housing having a plurality of trays and a pan tray located below the condensation trays.

The system has the wastewater stream pass through the oil separator and enter just above the stripper section to pour over the stripper trays and meet head-on steam from the steam inlet to remove hydrocarbons from the wastewater stream. The hydrocarbon is carried as vapor up into and through the condensation section where the vapors encounter a cold process fluid stream that carries away hydrocarbons back to a desalter stage to assimilate the hydrocarbons into crude being processed.

In accordance with another aspect of the present invention, there is provided a method for reducing hydrocarbons in a wastewater stream by removing insoluble oil, contacting the wastewater stream with steam to remove hydrocarbons, contacting the resulting vapors with a cold process fluid to condense hydrocarbons into the heated process fluid stream. This heated fluid stream is mixed with crude so that hydrocarbons can be assimilated into the crude.

Objects, features and advantages of this invention are to provide a system and method that can reduce hydrocarbons in a wastewater stream efficiently and effectively through a simplified and economical design, manufacture and assembly.

BRIEF DESCRIPTION OF THE DRAWINGS

The invention will be apparent from the following description, appended claims and accompanying drawings in which:

FIG. 1 is a schematic diagram of an improved hydrocarbon-reducing system for wastewater of the present invention.

DESCRIPTION OF A PREFERRED EMBODIMENT

With specific reference to FIG. 1, a diagram illustrates a hydrocarbon (in particular, benzene) reducing system 10 interconnected to a wastewater stream pipeline 12 that receives desalter effluent water from pipeline 14 and/or other contaminated water streams such as contaminated ground water from pipeline 16.

The benzene-reducing system 10 has two main sections: an oil separator 20 and a hydrocarbon stripper tower 22. Preferably, the oil separator 20 has a hydrocyclone 24 and an oily water separator drum 26 connected by conduit 28 to the stream exit of the hydrocyclone 24.

The hydrocarbon stripper tower 22 is made up of a column housing 32 having a stripper section 34 located in its lower portion and a condensation section 36 located in the upper portion of the column housing 32. The stripper section 34 includes a number of spaced-apart trays 40 (preferably eleven) and a steam inlet 42 located below these trays 40.

The condensing section 36 includes several trays 44, with the preferred embodiment having four stacked one on top of the other. Located below these is a pan tray 46, with chimney risers to allow vapors to pass from the stripper section 34 into and through the condensation section 36.

The column housing 32 has several openings through its perimeter, one located above the stripper section 34 to accommodate the wastewater feed line 50 and another opening to accommodate cold process fluid stream in line 52. Out of the top of the column housing 32 is a line 54 that leads to a low pressure gas system. Out of the bottom of the column housing 32 is a pump-out line 58 that directs the treated wastewater stream to a heat exchanger 56.

In operation, the benzene-reducing system 10 is used in a process of the present invention, as now will be described. Desalter effluent water in line 14 is received hot from the desalter stage 60. Contaminated water from tank 62 is received through line 16 and is heated in heat exchanger 56. The total wastewater stream is carried by line 12 into the oil separator 20.

In the preferred embodiment, the wastewater stream is fed into first a hydrocyclone 24 that uses fluid momentum intensity effects to remove and/or coalesce insoluble oil droplets in the wastewater stream. Any remaining insoluble oil droplets in the wastewater stream is separated by oil/water separator drum 26. These operations may be reversed. The wastewater stream, less any insoluble oil, is deposited into the hydrocarbon stripper 22 via line 50. The wastewater stream is spilled over the eleven trays 40 and is met from the bottom up by a stripping stream from the steam inlet 42. This steam strips the benzene and other hydrocarbons from the wastewater stream and proceeds up and through the condensing section 36. The wastewater stream that has passed over the eleven trays 40 and reaches the bottom of the column housing 32 free of benzene and other soluble hydrocarbons. This treated wastewater stream is drained through an outlet into pump-out line 58 and directed to heat exchanger 56 to heat the contaminated water stream before it enters the oil separator 20. This operation reduces the amount of steam necessary for hydrocarbon stripping.

The vapors carrying the hydrocarbon pass through the chimney risers of the pan tray 46 and up through the four trays 44. Cold process fluid is introduced through line 52 and contacts the vapors and condenses the hydrocarbons, as well as the steam, into the cold process fluid. Part of this cold process fluid is fresh makeup water from line 72. This fluid proceeds down and through the trays onto the pan tray 46. The pan tray 46 is the total draw tray; it removes all of the now heated process fluid stream ladened with condensed hydrocarbons out to line 64. This heated stream is split up wherein a portion is directed into a line 66 that passes through a cooler 68 and becomes a chilled process fluid stream in line 74. This stream is mixed with fresh makeup water from line 72 to become cold process fluid for further condensation purposes.

The remaining portion of the heated process stream is diverted to line 70 to be mixed with the crude in line 76. Because of the equilibrium conditions in the desalter stage 60, the heated process fluid stream passes benzene and other hydrocarbons to the crude to be processed with the bulk of the benzene from the crude in the normal refinery processing flow. An advantage of this hydrocarbon-reducing system is that the hydrocarbon-laden process water is heated by the steam vapor and eliminates the need for heating desalter makeup water, resulting in fuel savings at the crude heater.

This system and process reduces benzene in wastewater streams, meeting the environmental regulations set down by the Environmental Protection Agency. Also, this system reduces energy costs by providing heated process fluid stream to be mixed with the crude, saving fuel at the crude heater. Additional energy savings are realized by heating the contaminated water stream before the hydrocarbon stripper tower, because less steam is necessary for stripping.

It is to be understood that the terminology, as employed in the description and claims incorporated herein, is used by way of description and not by way of limitation to facilitate understanding of the structure, function and operation of the combination of elements which constitute the present invention. Moreover, while the foregoing description and drawings illustrate in detail working embodiments of the invention, to those skilled in the art to which the present invention relates, the present disclosure will suggest many modifications in construction, as well as widely differing embodiments and applications without thereby departing from the spirit and scope of the invention. The present invention, therefore, is intended to be limited only by the scope of the appended claims in the applicable prior art.

What is claimed is:

1. A process for reducing benzene in desalter effluent water comprising the steps of:
   a. removing insoluble oil from the desalter effluent water;
   b. contacting the desalter effluent water with steam to remove benzene from the desalter effluent water to produce vapors containing hydrocarbons;
   c. contacting said vapors containing hydrocarbons with a cold process fluid stream;
   d. condensing vapors containing hydrocarbon into the cold process fluid stream which results in a heated process fluid stream;
   e. mixing a portion of the heated process fluid stream with crude oil to deposit hydrocarbons into the crude oil;
   f. cooling a remaining portion of the heated process fluid stream to create a chilled fluid stream; and
   g. mixing the chilled process fluid stream with fresh makeup water to create the cold process fluid stream to condense additional vapors containing hydrocarbons.

* * * * *